B. MAYFIELDS.
PUMP ATTACHMENT FOR AUTOMOBILES, &c.
APPLICATION FILED JAN. 17, 1914.
1,133,992.
Patented Mar. 30, 1915.
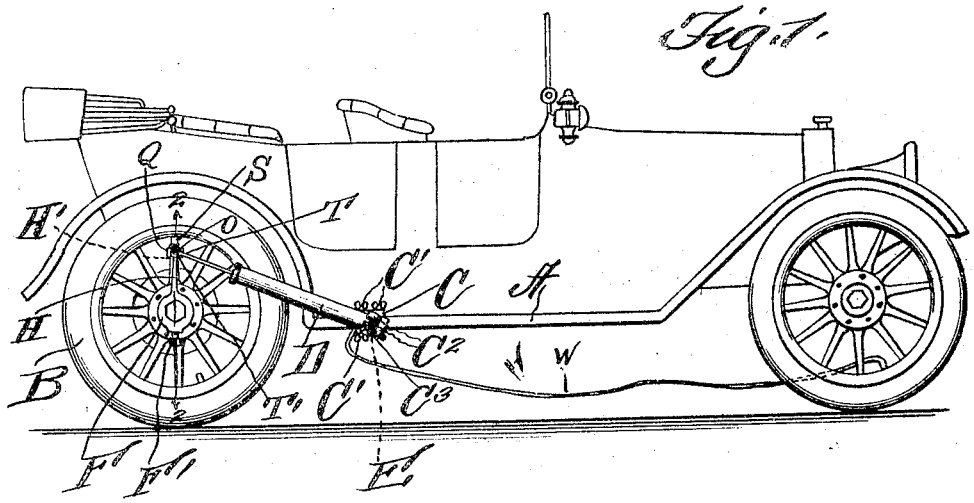
Inventor
Bernard Mayfields,
Witnesses
By Franklin N. Hough
Attorneys

UNITED STATES PATENT OFFICE.

BERNARD MAYFIELDS, OF BALTIMORE, MARYLAND.

PUMP ATTACHMENT FOR AUTOMOBILES, &c.

1,133,992.

Specification of Letters Patent.

Patented Mar. 30, 1915.

Application filed January 17, 1914. Serial No. 812,302.

*To all whom it may concern:*

Be it known that I, BERNARD MAYFIELDS, a citizen of the United States, residing at Baltimore, in the State of Maryland, have invented certain new and useful Improvements in Pump Attachments for Automobiles, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in pump attachments for automobiles of various kinds and the object in view is to produce a simple and efficient device of this nature so arranged that the pump may be attached to the frame of the vehicle and the piston to the rear driving wheel, the power wheel being jacked up so that, when the wheel is rotated, the pump may be operated.

The invention comprises a simple and efficient device of this nature having various details of construction and combinations and arrangements of parts which will be hereinafter fully described, shown in the accompanying drawings and then specifically defined in the appended claim.

I illustrate my invention in the accompanying drawings, in which:—

Figure 1 is a side elevation showing the attachment of my pump to the running board and the hub and spoke of an automobile. Fig. 2 is a sectional view on line 2—2 of Fig. 1, and Fig. 3 is an enlarged detail view showing the means for attaching the pump to the running board. Fig. 4 shows a detail of the attachment.

Reference now being had to the details of the drawings by letter, A designates the running board of an automobile and B the rear wheel. A clamping member, designated by letter C, is fastened to the board by means of a suitable clamping screw C'. Said clamping member has jaws C² which are adapted to frictionally engage the circumference of an ordinary air pump D, having a piston. The jaws which clamp the air pump have hinge connections at E with the clamp which holds the pump to the running board in order that the pump may oscillate as the wheel rotates. A collar, designated by letter F, is clamped about the circumference of the hub and has an arm H projecting therefrom, grooved at its end as at H' to receive a bar O, having a clamping member Q at one end for engagement with a spoke S of a rear wheel, and to said bar is fastened the threaded end of the piston at T, there being a suitable hinged joint T' provided in order to allow the piston to reciprocate as the wheel rotates.

By the provision of a device embodying the features of my invention, it will be noted that means is afforded whereby an ordinary air pump may be attached to the running board of automobiles of various makes, while the power for operating the pump is derived from an attachment to the hub and spoke of a wheel, making the device applicable to any type of vehicle.

In operation, the wheel which operates the pump is jacked up in order that it may be out of contact from the ground and made to rotate by the operation of the engine, while the pipe W may be attached to any one of the tires for inflating the same. When the device is not in use, it may be readily detached from the vehicle, as will be readily understood.

What I claim to be new is:—

In combination with a spoke wheel, a bar having a forked end provided with concaved resilient arms adapted to engage a spoke of said wheel, the ends of the arms projecting beyond the latter and parallel with each other, a thumb screw passing through registering apertures in said parallel ends, a second bar adapted to be fastened at one end to the hub of the wheel, its other end forked and provided with concaved resilient arms for engagement with said spoke engaging bar, and means for clamping the bars together, the end of the spoke engaging bar designed for attachment to a reciprocating rod.

In testimony whereof I hereunto affix my signature in presence of two witnesses.

BERNARD MAYFIELDS.

Witnesses:
J. A. HITCHCOCK,
WM. A. McLERAN.